United States Patent [19]

Sharpe

[11] Patent Number: 4,485,804
[45] Date of Patent: Dec. 4, 1984

[54] SOLAR HEAT COLLECTOR SYSTEM
[75] Inventor: Timothy E. Sharpe, Lakehurst, N.J.
[73] Assignee: T. E. Sharpe, Lakehurst, N.J.
[21] Appl. No.: 408,462
[22] Filed: Aug. 16, 1982

Related U.S. Application Data

[62] Division of Ser. No. 230,307, Jan. 30, 1981, Pat. No. 4,360,005.

[51] Int. Cl.$^3$ .............................................. F24J 3/02
[52] U.S. Cl. .................................. 126/426; 126/450; 165/135
[58] Field of Search ............... 126/426, 422, 444, 450, 126/417, 432, 419; 165/135, 136

[56] References Cited

U.S. PATENT DOCUMENTS

| | | | |
|---|---|---|---|
| 2,455,835 | 12/1948 | Ushakoff | 126/426 |
| 3,125,091 | 3/1964 | Sleeper | 126/426 |
| 3,174,915 | 3/1965 | Edlin | 126/426 |
| 3,326,624 | 6/1967 | Maydell | 126/426 |
| 3,908,631 | 9/1975 | Rom | 126/426 |
| 3,949,095 | 4/1976 | Pelehach | 126/426 |
| 4,015,586 | 4/1977 | Vroom | 126/426 |
| 4,033,326 | 7/1977 | Leitner | 126/426 |
| 4,036,209 | 7/1977 | Press | 126/432 |
| 4,043,317 | 8/1977 | Scharfmann | 126/422 |
| 4,046,134 | 9/1977 | Scott | 126/422 |
| 4,150,659 | 4/1979 | Buckley | 126/422 |
| 4,182,307 | 1/1980 | Brindle | 126/426 |
| 4,203,420 | 5/1980 | Schoenfelder | 126/426 |
| 4,219,009 | 8/1980 | Palmer | 126/419 |
| 4,271,822 | 6/1981 | Radebold | 126/426 |
| 4,392,481 | 7/1983 | Moore | 126/418 |

Primary Examiner—Daniel J. O'Connor
Attorney, Agent, or Firm—Fred A. Wilson

[57] ABSTRACT

This invention discloses a solar heat collector and system in which radiant heat energy is absorbed by an absorber plate and the heat is transferred by conduction to a circulating fluid. During normal operation, heat loss from the solar panel is reduced by covering the upper side of the absorber plate with an inflatable transparent cover, and also covering the rear side of the panel with an insulating material which can be an inflatable insulating bladder.

The invention pertains more particularly to a solar heat collector which can be inactivated to avoid it attaining excessive temperatures by deflating the flexible transparent cover and allowing it to settle close to the absorber plate, thereby establishing increased heat transfer by conductive and convective processes from the absorber plate to the environment. The deflated cover permits sufficient heat rejection to prevent the plate from attaining excessive temperatures during its inactive or stagnant operating mode. If desired, a second transparent inflatable cover can be provided spaced above the absorber plate and operated similarly to improve thermal performance of the collector in its active operating mode.

11 Claims, 8 Drawing Figures

The Solar Panel of Figure 1 with the Covers
and Insulating Bladder Deflated

Typical Panel Performance Curves for Different Configurations

Relationship between Heat Transfer Coef. and Absorber/Cover Spacing

Solar Collector Panel similar to Figure 1 in a Thermal Siphon System

SOLAR HEAT COLLECTOR SYSTEM

This is a division of application Ser. No. 230,307, filed Jan. 30, 1981, now U.S. Pat. No. 4,360,005.

BACKGROUND OF THE INVENTION

This invention pertains to a solar heat collector apparatus and method for use. It pertains particularly to a solar heating panel made principally of plastic materials and having a flexible inflatable cover, arranged to provide variable thermal performance and also prevent high stagnation temperatures which can cause thermal damage to the collector materials.

Solar heat collectors are well known in the patent art and have received renewed interest recently because of energy shortages and increasing energy costs. Early solar collectors or heating panels were constructed of rigid materials such as glass and metal tubing. Consequently, they were heavy and cumbersome to handle and install, and were also undesirably expensive to construct and to use. Non-rigid solar collectors constructed of plastic materials have been proposed recently, such as disclosed in U.S. Pat. No. 3,859,980 to Crawford, U.S. Pat. No. 4,036,209 to Press, U.S. Pat. No. 4,159,709 to Polazzetti and U.S. Pat. No. 4,160,443 to Brindle. However, these plastic solar panel designs do not protect the plastic materials from reaching excessive stagnation temperatures during inactive periods of panel operation when no fluid circulation occurs (stagnation mode). Also, these prior art panels do not provide a sufficient range of thermal efficiency during operation to cover all situations which could be encountered during normal usage. Thus a need clearly exists for a solar heating panel able to provide protection against thermal damage during stagnation mode, variable thermal performance as needed, convenient installation, and low cost.

SUMMARY OF THE INVENTION

The present invention provides an improved solar heat collector having an absorber plate containing a plurality of passages which are fillable with a heat absorbing fluid. The absorber transforms incident solar radiation to thermal energy to heat the circulating fluid during the heat absorptive operating mode of the panel.

The absorber plate may be made of either rigid or flexible construction and should have a dark color such as flat black, dark brown or dark green to increase heat absorption of the plate. Suitable materials for rigid plates are metals and plastics, with plastics being preferred for reason of cost.

The solar collector configuration is arranged to prevent undesired loss of heat from the absorber panel to the atmosphere during the heat absorption mode. This is accomplished by providing a cover sheet substantially transparent to solar energy and spaced over the absorber plate element, which provides a "dead air" thermal insulation space, which thereby increases the thermal efficiency of the panel. The insulation space can be varied by providing an inflatable cover sheet made of a flexible plastic material substantially transparent to solar energy. This cover sheet is inflated to increase thermal insulation during the heat absorption mode and is deflated by venting during the inactive or stagnant operating mode to improve its heat dissipation characteristics.

As an alternative construction, the cover can be comprised of a substantially rigid sheet attached to the collector by bellows or other inflatable means to permit varying the spacing by inflation and venting. An alternative to inflation, the spacing can be varied by mechanical means such as wax motors, bimetalic strips or other thermally-activated means.

Suitable thermal insulation is also provided on the rear or shade side of the absorber plate to prevent undesirable heat loss from that side of the panel. Such rear side insulation should have a suitably high R value, such as R-3 to R-15, and can be made either rigid or flexible. The rear side insulation can advantageously be provided by an inflatable plastic member structurally similar to that provided on the upper or solar exposed side of the panel. The rear side insulation is preferably an inflatable bladder composed of flexible tubular or modular segments. By using flexible materials for the three main components, absorber, cover and insulation, the entire heat absorbing panel assembly can be made flexible.

As is known in the solar heating field, during periods when solar collector panels are inactive, high temperatures may be reached inside the solar collector due to continued solar heat input without accompanying heat extraction, which can damage the various plastic materials and shorten the useful life of the collector. Such high temperatures can occur whenever heat absorption is not required by the heat absorbing fluid and/or the fluid is not being circulated through the panel passages and heat is not being carried away from the panel. This is particularly true when heat sensitive plastic materials or coatings are used, such as polyethylene, polypropylene, polyurethane, etc. The useful life of such plastic materials is appreciably reduced by extended exposure to high temperatures, such as exceeding about 250° F. for several hours. Time-temperature relationship data for plastics show that limiting the panel temperatures to a safe level significantly increases the useful life of these plastic structural and coating materials.

It is an important feature and advantage of this invention that during inactive periods of solar panel operation, the solar collector or heat absorbing panel is protected from reaching such excessive and potentially damaging temperature levels; for example, by deflating the flexible transparent cover sufficiently to increase the panel thermal losses. This procedure improves the heat rejection capability of the absorber system sufficiently to limit the panel stagnation temperatures. Thus, the panel temperatures do not exceed "safe" design limits established for the materials being used, such as not exceeding about 225°-250° F. for polyropylene plastic materials. More specifically, this panel inactivation is accomplished by the cover being moved closer to the plate, such as by deflating the flexible transparent cover sufficiently to increase the thermal conductive and convective losses from the absorber plate through the cover to the surrounding environment. To assure that the cover returns close to the absorber plate and their average spacing is reduced, the cover can be weighted or tensioned, or sufficient gas can be withdrawn from the space to inactivate the panel.

The general relationship between such solar panel heat rejection and the spacing between the flexible cover and the absorber plate is such that the total heat loss, i.e. combined conductive and convective, increases significantly when the average spacing between the absorber plate and cover sheet becomes less than about 1.0 inch (2.5 cm), preferably less than about 0.5 inch, (1.2 cm) and more preferably less than about 0.25 inch (0.64 cm). Furthermore, if the solar panel rear side insulating member is comprised of an inflated bladder, it can also be deflated and additional heat rejected from the absorber plate to the panel support structure environment. This solar heat absorbing panel thereby provides for variable thermal performance as needed, depending upon the heat absorption requirements for the panel and the desired operating mode.

Although any fluid may be used for heat absorption in the panel passages, the fluid is preferably a liquid instead of a gas due to the higher specific heat of liquids and their increased effectiveness as heat transfer and storage media. Any conveniently available low viscosity liquid can be used, such as water, solutions of water with chemicals such as ethylene glycol, or eutectic salts, with the preferred liquids being water and water-based solutions. For panel uses in applications whenever temperatures below the freezing point of water (32° F.) are encountered and the panel system remains filled at all times, liquid solutions having freezing temperatures below 32° F. should be used, such as water-ethylene glycol solutions.

The useful orientation of the solar heating panel of this invention can range from generally horizontal to vertical, with the upper or flexible cover side being directed toward the sun. The preferred panel orientation is between about 20 degrees and 80 degrees from the horizontal plane, so as to be generally perpendicular to direct solar radiation. This heat absorbing panel can also be oriented so as to receive indirect or diffuse radiation, or reflected radiation; however, under these situations the panel heat absorbing effectiveness may be somewhat reduced.

Uses for this solar heating panel include heating domestic hot water, heating building spaces, heating water in swimming pools, health spas and hot tubs, or also as a heat collection and rejection panel used in combination with a heat pump system for fluid or space heating or cooling applications. Although the panel is preferably made flexible for ease in shipping and installation, the absorber plate can be made either rigid and flat or have some particular desired shape such as formed or curved. For rigid solar panels, rigid plastic materials or metals such as aluminum, copper or steel can be used. Also, although this solar heating panel can be produced in a wide variety of sizes and shapes, rectangular panels having dimensions of 2–4 feet wide by 6–10 feet long are usually preferred for most applications.

An additional advantage of this invention is that the plastic materials used in the absorber plate will not corrode, collect scale or discolor either the liquids used or the mounting surfaces. These plastics are impervious to many chemicals such as acidic or caustic baths, used widely in industry, making the solar heating panels adaptable to heating such industrial and chemical baths.

DESCRIPTION OF PREFERRED EMBODIMENTS

Figure 1:
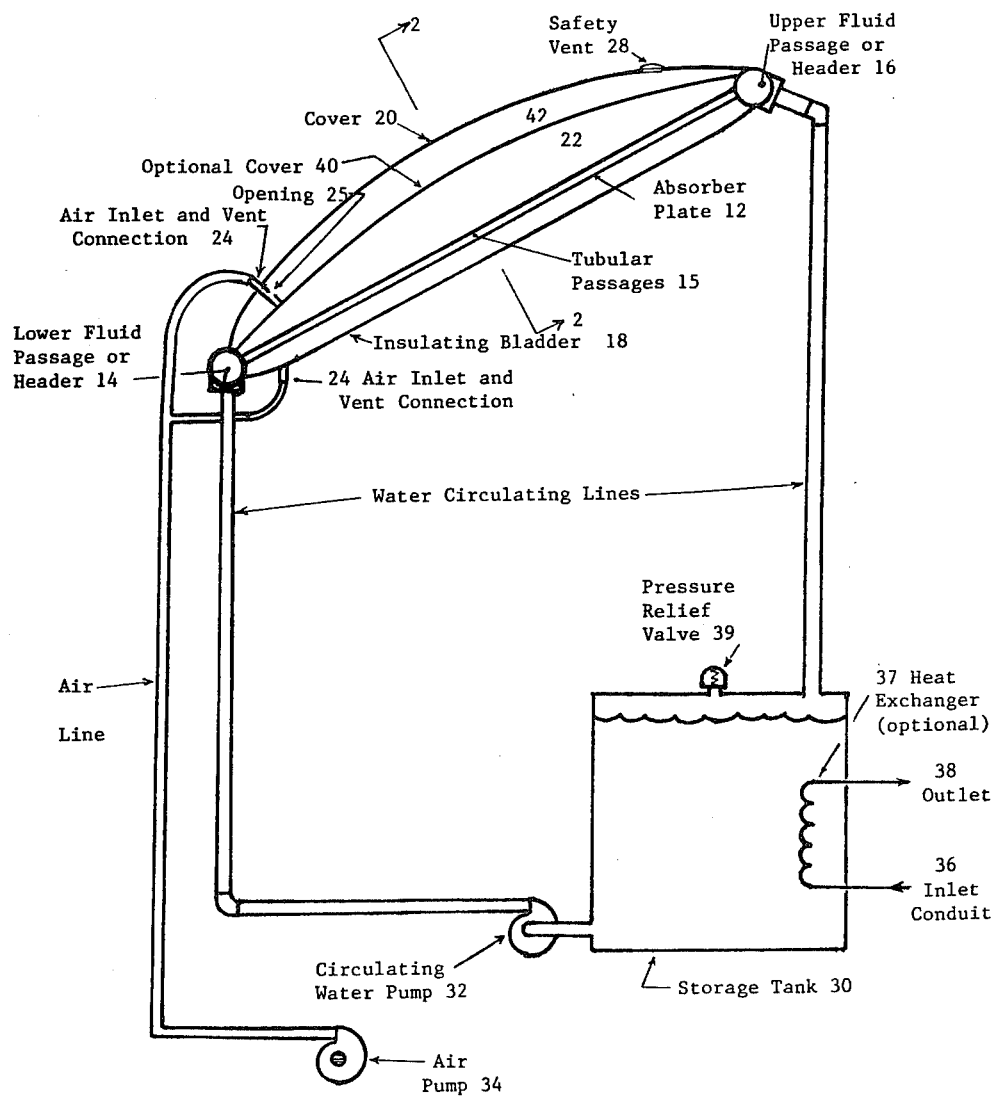
FIG. 1 shows a cross sectional side view of a solar heat collector panel having a tubular absorber plate, a rear side inflatable insulating bladder and covered by two inflatable covers, together with a simple fluid circulation system.
Figure 2:
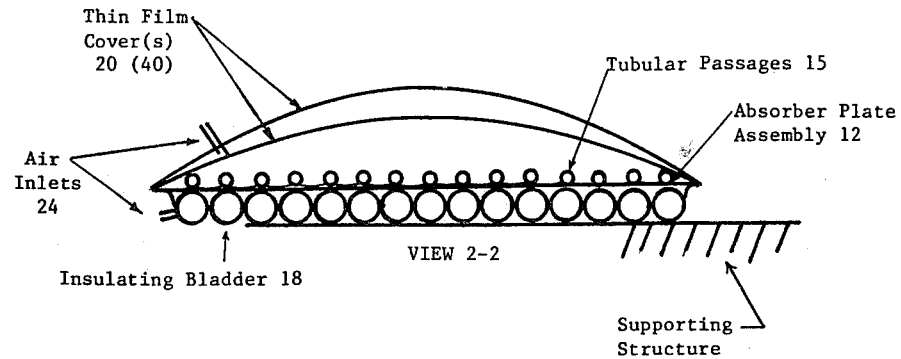
FIG. 2 shows a cross sectional view through the panel of FIG. 1 along lines 2—2.
Figure 3:
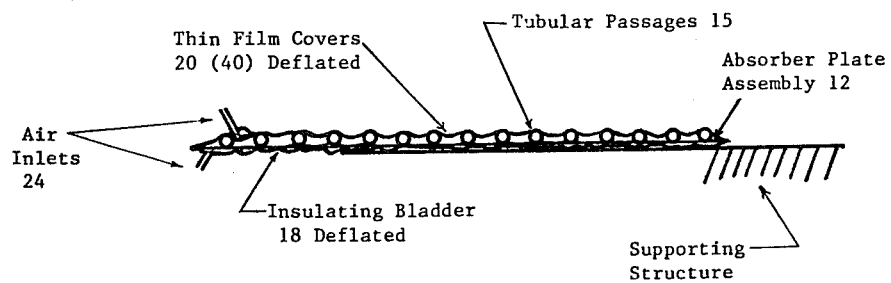
FIG. 3 shows the solar panel of FIG. 1 when the covers and insulating bladder are in a deflated or collapsed condition.

As shown in FIG. 1, the solar heat panel shown generally at 10 comprises an absorber plate 12 having a plurality of tubular passages 15 such as having circular or oval-shaped cross-sections and preferably parallel and each is connected to headers 14 and 16 for flow of the heat absorbing fluid (such as water) therethrough. The fluid passage should be capable of withstanding working pressures as determined by the application. Although such fluid could be either a gas or liquid, liquids are preferred in most applications because of their higher specific heat.

A transparent inflatable plastic cover 20 having thickness of about 1–10 mils is provided in spaced relationship above absorber plate 12 to reduce the convection, conduction and radiation heat losses from the plate to the atmosphere, and thereby increase the thermal efficiency of the solar heat panel 10. A second optional transparent cover 40 is shown as an alternative. The cover 20 is raised or inflated with a gas by pressurizing space 22, which includes all area between the cover 20 and the absorber plate 12 on a single cover collector. This gas, preferably air for convenience, is supplied to space 22 at connection 24 by any suitable means 34, such as a hand-operated pump, a motor-driven pump, or a pressurized gas source. Thermal insulation is provided on the rear side of absorber plate 12 in the form of an inflatable bladder 18 made of a suitable flexible plastic material.

It is an important feature of this invention that the spacing of cover 20 above absorber plate 12 can be varied depending upon whether the solar panel is in a heat absorbing mode or in a heat rejection mode, i.e., a stagnation or cooling mode. When it is desirable for the panel to absorb solar heat into the circulating liquid, the cover 20 is inflated so that the average spacing of the cover above the absorber plate exceeds about 1 inch overall for thermal performance reasons, but usually need not exceed about 12 inches structurally. In contrast, when it is desired for the panel to reject excessive heat so as to prevent overheating the panel material, or for any other reason such as for rejecting heat from a storage tank or a heat pump system used for space cooling, the gas in space 22 is vented to the atmosphere through connection 24. This allows cover 20 to descend to be in close proximity with (less than about 0.5 inch average spacing) and provides increased thermal contact with absorber plate 12. Also, if desired, space 22 can be vented through a temperature-sensitive safety vent 28, which is arranged to open when the temperature of the collector reaches a predetermined setting selected to prevent damage to the absorber plate materials. Such a temperature setting might be about 225° F. for polypropylene materials.

SOLAR HEAT COLLECTOR SYSTEM

FIG. 1 also illustrates a typical solar heat collector system in which the circulating liquid is removed from storage receptacle 30 and is circulated by pump 32 to the panel lower or inlet header 14. The liquid then passes through multiple tubular passages 15 to upper or outlet header 16, from which it is returned to storage receptacle or sump 30. The flow direction is preferably from the panel bottom upwardly to the top header through passages 15, so as to assure that all the passages are filled with liquid and to provide even flow distribution and uniform thermal contact (fully wetted surface) between the absorber plate and the heat transfer fluid. The space between the absorber plate 12 and cover 20 can be inflated with a hand operated air pump, and safety vent 28 used for deflating space 22 to provide thermal protection for the panel materials. This collector configuration is useful for a thermal siphon system as described hereinafter.

Alternatively, a small motor-driven air pump 34 can be used to pressurize space 22. Operation of air pump 34 and water-circulating pump 32 can be coordinated by a control system, so that whenever operation of pump 32 is interrupted and water circulation through passages 15 is stopped, operation of air pump 34 is also interrupted. Thus, air space 22 is vented and flexible cover 20 descends into close proximity to absorber plate 12. To assure that space 22 deflates, the cover can be weighted or tensioned or sufficient gas can be withdrawn such as by reversing the operation of the air pump, or by other suitable means.

A typical control system comprises a solar differential temperature controller which monitors the temperature of the tank and of the solar collector and operates based on the temperature differential, activating the system whenever energy is desired and available. The controller may also have low and high temperature limits to prevent freeze-up or overheating the panel. In addition, temperature-sensitive safety vent 28 is provided, preferably in cover 20, and is constructed so as to open whenever the temperature of the heat absorption plate 12 reaches a predetermined range, such as 180°–240° F. depending upon the temperature sensitivity of the plastic material and the environmental conditions. This safety vent 28 may be either a single operation type such as a wax motor, or an automatically resettable, such as a metal diaphragm type, with the automatically resettable type vent usually being preferred. Cool or fresh liquid is added to tank 30 via conduit 36, and the heated fluid is withdrawn as needed through conduit 38. If the circulating or primary heating fluid is different from the fluid being withdrawn from tank 30 for use (secondary fluid), a heat exchanger 37 can be provided within tank 30 to exchange heat between the primary and secondary or external system fluids. Also, if the circulating fluid system is sealed, a pressure relief valve 39 can be provided to relieve any excessive pressure, such as exceeding about 5 psig.

The preferred heat absorbing liquid is water because it has a relatively high specific heat value, and is readily available. Ethylene glycol or other non-freezing solutions normally have lower specific heat than water, but have the advantage of remaining liquid in systems or during conditions where sub-freezing temperatures are encountered. Eutectic salts or other solutions have higher specific heat than water, but they are usually more difficult to work with and more costly. These and other liquids or solutions may be used in the described collector.

As an alternative panel construction shown in FIG. 1, a second flexible transparent cover sheet 40 may be provided above absorber plate 12 and spaced between cover 20 and absorber plate 12. This second cover serves to further reduce the loss of heat from the absorber plate 12 to the atmosphere, and thus further increases the thermal efficiency of the solar panel when in the heat absorption mode. The space 42 between covers 20 and 40 is also inflated with a gas such as air through connection 24 by an opening 25 located between the inflatable covers 20 and 40, or through an opening 26 in cover 40, or a separate tube or some similar means. Thus, the outer flexible cover 20 is essential to the invention, and can be augmented by at least one or more additional flexible inner cover(s) 40 with appropriate spacing changes. The space 42 between cover 20 and cover 40, or others, should be inflated from the inner space 22 outward, to assure that all spaces are reliably inflated. The inflatable insulating bladder 18 located on the rear side of absorber plate 12 could also be connected to the same inflating mechanism.

Figure 4:
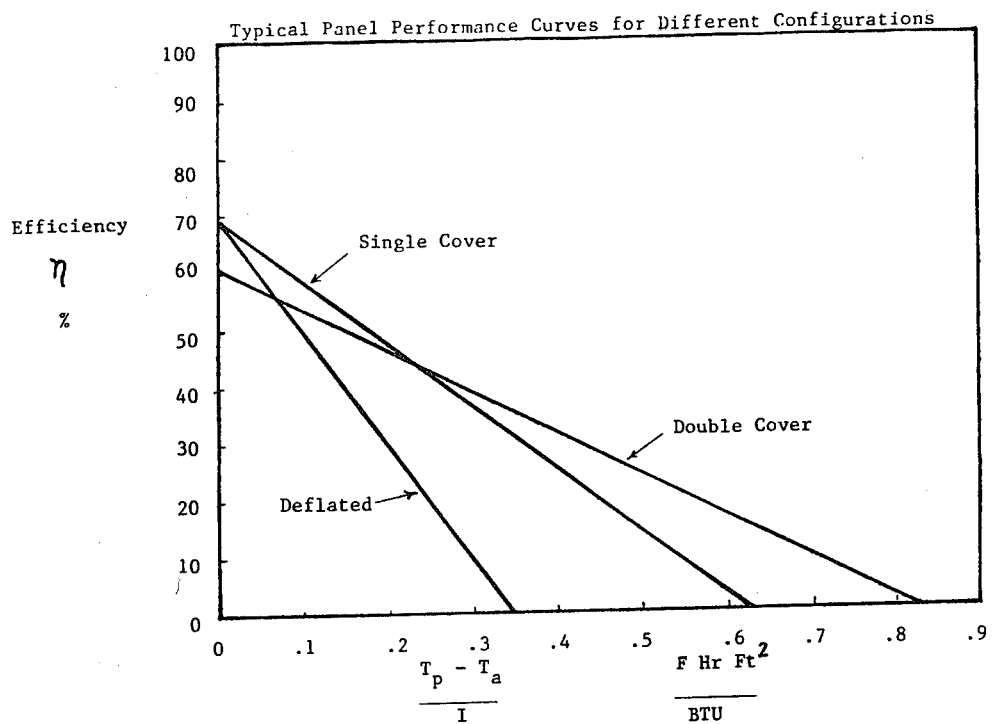
FIG. 4 shows typical performance curves for various configurations of a solar panel constructed in accordance with the invention.

As previously pointed out, it is an important feature of this invention that the solar panel provides for variable thermal performance in the form of a heat loss factor that is variable during its operation. FIG. 4 shows typical Hottel-Whillier efficiency curves for different configurations of the solar collector panel 10. As per discussion in Section 8.2.1 of ASHRAE Standard 93-77, efficiency $\eta$ is plotted versus the term $(T_p-T_a)/I_t$ where $T_p$ is the plate temperature, $T_a$ is the ambient air temperature, and $I_t$ is the total solar radiation incident upon the panel. This results in a straight line where the slope is equal to $F_r U_1$ and the y intercept is equal to $F_r (\tau \alpha)e$. Here $U_1$ is the collector heat transfer loss coefficient, $F_r$ is the solar heat removal factor defined as the actual useful energy collected by a flat plate collector divided by the useful energy collected if the entire flat plate collector surface were at the inlet fluid temperature, and $(\tau \alpha)e$ is the effective transmittance absorptance factor.

Although, $U_1$ is not a constant but a function of the collector temperature and the ambient weather conditions, a worse case stagnation condition occurs if $U_1$ is treated as a constant. Also, although $(\tau \alpha)e$ varies with the incident angle between the solar radiation and the collector, a constant worst case condition of direct normal radiation will be considered for the purpose of stagnation temperature evaluation. In addition, as the collector efficiency approaches zero (the x axis), the difference between the plate temperature and the fluid inlet temperature approaches zero; therefore, they will be treated as equal for the purpose of this discussion.

Taking equation 8.4 from page 18 of ASHRAE Standard (93-77), setting efficiency $\eta$ equal to zero and simplifying results in:

$$(8.4) \eta = F_r(\tau\alpha)e - F_r U_l \frac{(T_{f,i} - T_a)}{I_t} = 0$$

where:
$T_{f,i}$ (fluid inlet temperature = Tp (plate temperature),
$U_l$ and $(\tau\alpha)e$ are considered constant,
then:

$$\frac{(\tau\alpha)e}{U_L} = \frac{(T_p - T_a)}{I_t}$$

where:

$$\frac{(\tau\alpha)e}{U_L}$$

(the loss factor reciprocal) is the point where efficiency equals zero, i.e., no useful energy is being extracted from the collector and input equals losses or simply the stagnation point. This point or the loss factor reciprocal determines the upper temperature limit reached for a particular collector under a given set of conditions.

Figure 5:
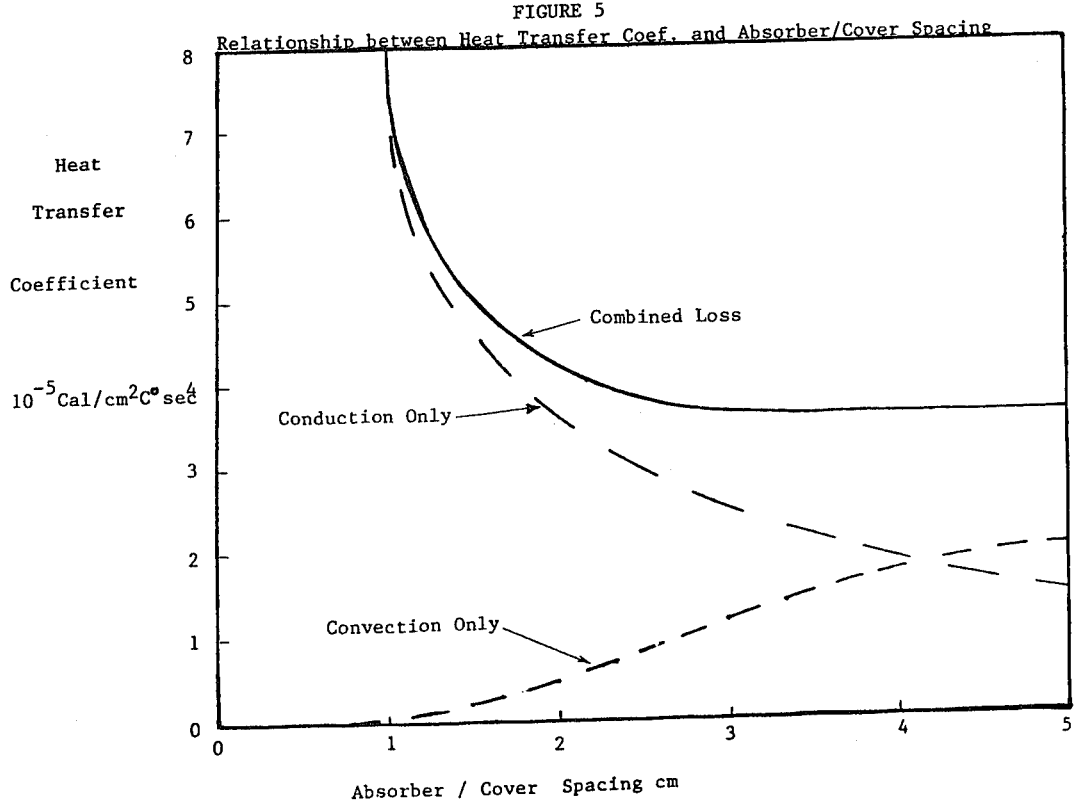
FIG. 5 is a diagram showing the general relationship concerning convective, conductive and total heat transfer modes between the absorber plate and cover.

The heat absorbing panel having a single inflatable flexible cover 20 provides a moderate loss factor reciprocal in the range of 0.55–0.75. However, when the cover sheet 20 is deflated so as to be in close thermal contact with the absorber plate 12, i.e., less than about 0.5 inch average spacing therebetween, the reciprocal loss factor is decreased to only 0.25–0.4. This lower loss factor reciprocal serves to reject sufficient heat from the panel to protect the panel material from developing excessive stagnation temperatures. The relationship between heat rejection from the solar panel and the average spacing between the absorber plate and the flexible cover sheet is generally shown by FIG. 5, which shows the variation of the conductive, convective, and combined heat losses with cover spacing above the plate. As is apparent, the total heat losses (combined conductive and convective) increase significantly as the spacing between the absorber plate and flexible cover is less than about 0.5 inch.

Figure 6:
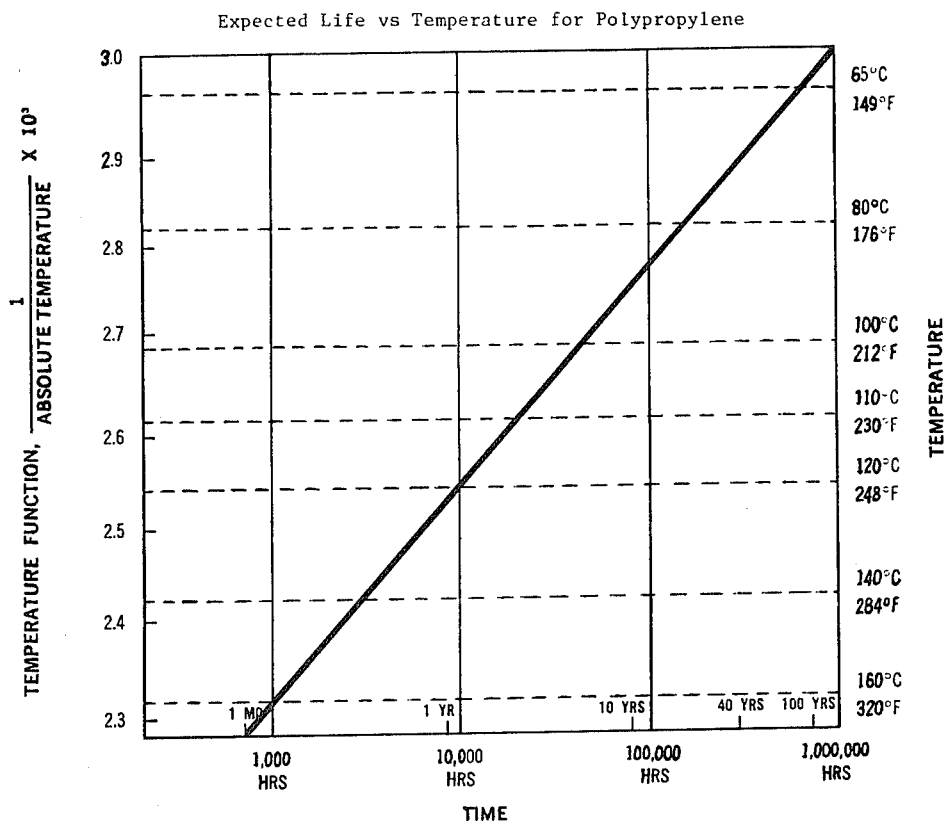
FIG. 6 is a diagram showing the general logarithmic relationship between operating temperature and the expected life of typical plastic materials suitable for use in a solar heat collector.

As an example, consider a severe or worst case condition of a reciprocal loss factor ($1/U_L$) of 0.4 with ambient temperature (Ta) of 120° F. and a solar insolation (I) value of 325 BTU/feet²—hr. Putting these numbers into the equation:

$$\frac{1}{U_L} = \frac{T_p - T_a}{I}$$

and solving for plate temperature Tp, one finds a worst case plate stagnation temperature of 250° F. As seen from FIG. 6, which is a logarithmic time vs. temperature relationship curve for usual plastic materials suitable for this invention, such as polypropylene, etc., this 250° F. temperature is within suitable limits for the expected material life.

Furthermore, whenever improved solar panel thermal performance is desired, a second cover sheet 40 can be used above the absorber plate as previously mentioned, which provides an improved panel reciprocal loss factor when inflated in the range of 0.75–0.95 without seriously affecting the deflated panel loss factor reciprocal value.

Figure 7:
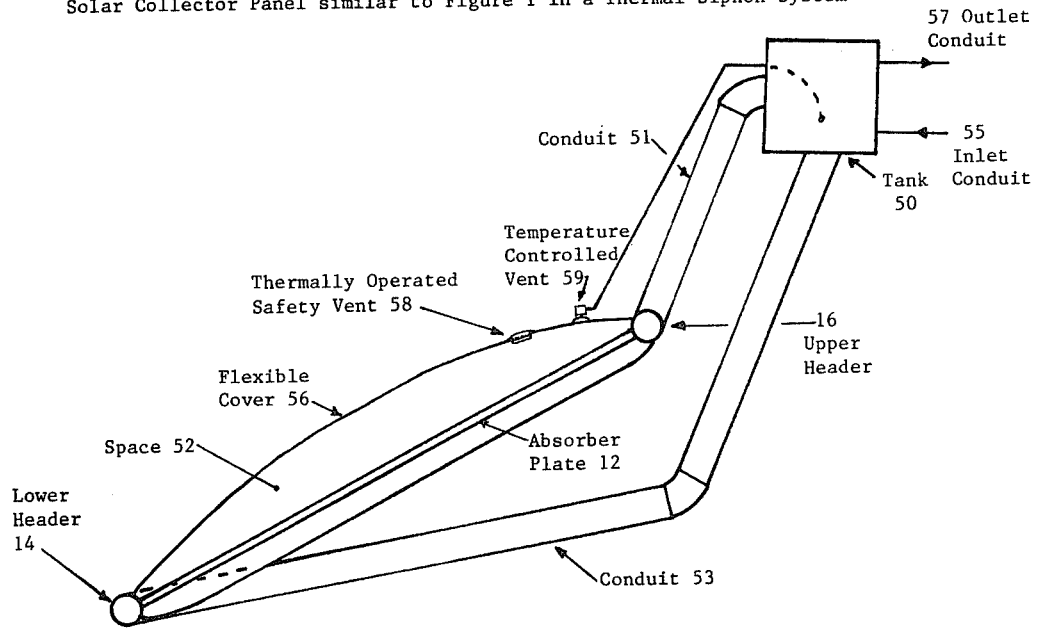
FIG. 7 shows a solar heat collector panel system similar to FIG. 1 embodiment except utilizing a thermal siphon flow arrangement to facilitate fluid transfer.

An alternative embodiment of this invention is shown by FIG. 7, wherein the panel heat absorbing fluid is circulated by a thermal siphon system. In this configuration, tank 50 is located above panel upper header 16 and the fluid is circulated by gravity force alone, so that warmed fluid in the panel upper header 16 flows upwardly through conduit 51 to tank 50 for storage, and/or use. Cool fluid from tank 50 flows by gravity downward through conduit 53 to panel lower header 14. Whenever the liquid temperature in tank 50 exceeds a desired temperature, so that no further liquid circulation and heating is needed, flexible cover 56 is deflated such as by thermally operated vent 58 and descends to be in close thermal contact with absorber plate 12, thus reducing the solar heat input to the fluid by increasing the panel heat rejection and preventing the panel material from reaching excessive temperatures. If desired, a temperature controlled vent 59 can be provided which will open at a predetermined tank temperature and vent gas from space 52. When a heating mode is again desired, space 52 can be reinflated by suitable means, such as a hand operated air pump (not shown). Cool liquid is supplied to tank 50 from conduit 55, and heated liquid is withdrawn through conduit 57. Similarly as for FIG. 1, if the circulating heat transfer fluid needs to be different from the fluid being withdrawn for use, a heat exchanger (not shown) can be provided within tank 50 to heat the user fluid.

Figure 8:
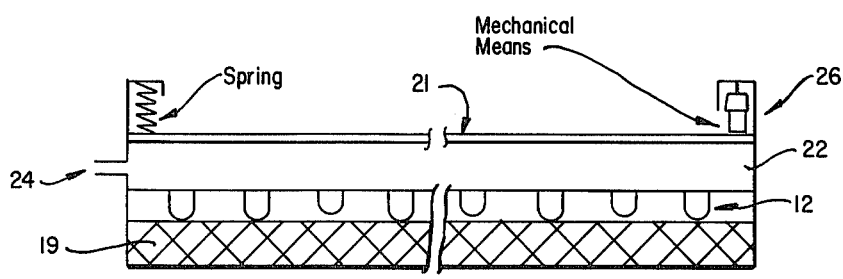
FIG. 8 shows a cross-sectional view of an alternative heat collector panel having a rigid cover sheet and rigid thermal insulation.

Another alternative embodiment of the solar heat collector panel is shown in FIG. 8, in which heat absorber plate 12 has a rigid cover 21 substantially transparent to solar radiation positioned above the plate so as to provide enclosed space 22 therebetween. The cover 21 is movable relative to the plate 12 so as to provide spacing variable from greater than about 1 inch during a heat absorption mode to less than about 0.5 inch to provide increased thermal contact between the cover and the absorber plate during the heat rejection mode for the plate. Rigid thermal insulation 19 is provided on the rear or shade side of the plate 12 to reduce heat losses from the plate. The spacing between cover 21 and plate is made variable either by pressuring the space 22 by a gas from connection 24 or by mechanical means 26, which can be a wax motor or a bi-metallic strip which is arranged so as to move cover 21 closer to plate 12 as the temperature of the plate increases.

As a further modification of the FIG. 1 solar heating system, the solar heat absorbing panel of this invention can be used in an all-gas solar heating system in which the heat storage device instead of being a water tank is a chamber containing heat-retaining materials having high specific heat, such as stones, containers filled with water, or containers filled with eutectic salts.

The features of this invention are further described and illustrated by reference to the following example, which is not to be construed as limiting the scope of the invention.

EXAMPLE

A solar heating panel is constructed having dimensions approximately 4 feet wide and 8 feet long, with the absorber plate made of black polypropylene plastic material having a plurality of tubular passages for liquid flow. The cover sheet is made of clear, transparent and flexible polyester film 5 mils thick. The film is sealed to the absorber plate around its periphery, and the space therebetween is inflated with air. The tubular passages provided in the abosrober plate having circular shaped cross sections, and are connected through a piping system and circulating pump to a storage tank filled with water. The air inlet is connected to an air inflation pump and both pumps are operated by a common control. The panel assembly is laid on a roof oriented at about a 45 degree angle with the horizon and exposed to sunlight.

During the panel heat absorbing mode (pumps operating and cover inflated) the water flowing through the tubular passages increases in temperature until the storage tank reaches a set temperature, such as 140°-200° F. When no further heat is required in the storage tank, the pump stops, the water circulation ceases (stagnation mode) and the panel inflation air flow also stops. When the air flow stops, the space between the absorber and flexible cover normally deflates and the flexible cover settles to be in close proximity to the heat absorbing plate. Such close spacing between these two elements increases heat losses from the absorber panel to the atmosphere, and thereby limits the stagnation temperature to a safe level, for example, about 200°-225° F.

If, for any reason, the air venting mechanism fails to function and the space does not deflate, e.g., blocked passage, and the stagnation temperature of the absorber plate increases and may exceed about 225° F., which is approaching the maximum safe temperature for the plastic material. When this occurs, the air in the space between the absorber plate and the flexible cover is vented to the atmosphere, through a temperature-sensitive safety vent, so that this space is deflated and the flexible cover settles to be in close proximity to the heat absorbing plate, thus protecting the panel. Then, when sufficient heat is withdrawn from the storage tank and there is again need to provide further solar heating of cool water, the circulating and inflation pumps start, the flexible cover is reinflated and increased solar heat is again absorbed by the water in the panel passages, and circulated to the storage tank with a minimum of thermal losses.

Although this invention has been described in some detail with reference to certain preferred embodiments, it will be understood that further modifications and variations in the panel configuration and its method of use can be made all within the spirit and scope of the invention, which is defined only by the following claims.

What I claim is:

1. A solar heat collector for absorbing and transmitting solar heat energy to a fluid, comprising:
   (a) an absorber plate having a plurality of integral passages for flow of said fluid therethrough;
   (b) a cover sheet substantially transparent to solar radiation covering the absorber plate on its solar exposure side so as to form an enclosed "dead air" thermal insulation space between the cover sheet and the absorber plate and reduce heat losses from the plate, said cover sheet being movable relative to the plate so as to provide spacing therebetween which is variable from greater than about 1 inch during a heat absorption mode, to less than about 0.5 inch to provide increased thermal contact between the cover and the absorber plate during a heat-rejection mode for the plate; and
   (c) means for varying the spacing between the cover sheet and the absorber plate to provide the transition between the heat absorption mode and the heat rejection mode, so as to vary the thermal characteristics of the solar collector.

2. The solar heat collector of claim 1 wherein thermal insulation is attached to the rear side of the absorber plate away from the solar exposure side to reduce heat loss from the absorber plate.

3. The solar heat collector of claim 2 wherein the thermal insulation on the absorber plate rear side is comprised of an inflatable bladder construction.

4. The solar heat collector of claim 2 wherein the transparent cover sheet is a substantially rigid sheet which is attached to the collector so as to permit varying the spacing by pressurizing and venting the space.

5. The solar heat collector of claim 4, wherein the thermal insulation attached to the absorber plate rear side is a rigid type insulation.

6. The solar heat collector of claim 2 wherein the transparent cover sheet is a substantially rigid sheet and the spacing is varied by mechanical means.

7. The solar heat collector of claim 1 wherein the cover comprises at least one flexible inflatable sheet and the spacing between the absorber plate and the cover is varied by inflating said cover sheet, and connection means are provided for pressurizing and venting the space between the absorber plate and the flexible cover(s).

8. The solar heat collector of claim 7, wherein a second flexible cover substantially transparent to solar radiation is provided spaced between said cover sheet and the absorber plate.

9. The solar heat collector of claim 1 wherein the cover is provided with return means to assure that it returns to its inactive position of less than about 0.5 inch (1.2 cm) average spacing from the absorber plate during the heat rejection mode.

10. The solar heat collector of claim 1 wherein a temperature-operated vent device is connected to the gas space between the cover sheet and the absorber plate, so as to vent gas from the space and permit the cover to return to its inactive position whenever the plate temperature exceeds a predetermined range.

11. A solar heat collector for absorbing and transmitting solar heat energy to a fluid, comprising:
   (a) an abosrber plate having a plurality of integral passages for flow of said fluid therethrough;
   (b) at least one flexible inflatable cover sheet substantially transparent to solar radiation covering the absorber plate on its solar exposure side so as to form an enclosed "dead air" thermal insulation space between the cover sheet and the absorber plate and to reduce heat losses from the plate, said cover sheet being movable relative to the plate so as to provide spacing therebetween which is variable from greater than about 1 inch during a heat absorption mode, to less than about 0.5 inch to provide increased thermal contact between the cover sheet and the absorber plate during a heat rejection mode for the plate;
   (c) means for varying the spacing between the cover sheet and the absorber plate to provide the transition between the heat absorption mode and the heat rejection mode, so as to vary the thermal characteristics of the solar collector; and
   (d) thermal insulation attached to the rear side of the absorber plate away from the solar exposure side to reduce heat loss from the absorber plate.

* * * * *